United States Patent [19]

Nagashima

[11] Patent Number: 4,695,895

[45] Date of Patent: Sep. 22, 1987

[54] IMAGE PROCESSING SYSTEM

[75] Inventor: Nao Nagashima, Yokohama, Japan

[73] Assignee: Canon Kabushiki Kaisha, Tokyo, Japan

[21] Appl. No.: 665,353

[22] Filed: Oct. 26, 1984

[30] Foreign Application Priority Data

Nov. 2, 1983 [JP] Japan .................................. 58-204757
Nov. 2, 1983 [JP] Japan .................................. 58-204758

[51] Int. Cl.⁴ .............................................. H04N 1/04
[52] U.S. Cl. ..................................... 358/280; 358/287
[58] Field of Search .......................... 358/260, 280, 287

[56] References Cited

U.S. PATENT DOCUMENTS

| | | | |
|---|---|---|---|
| 4,386,373 | 5/1983 | Kondo et al. | 358/260 |
| 4,491,874 | 1/1985 | Yamamoto | 358/260 |
| 4,500,926 | 2/1985 | Yoshimaru | 358/260 |
| 4,538,183 | 8/1985 | Kanno et al. | 358/280 |

Primary Examiner—Edward L. Coles, Sr.
Attorney, Agent, or Firm—Fitzpatrick, Cella, Harper & Scinto

[57] ABSTRACT

There is disclosed an image processing system for storing image data obtained by reading an image and reproducing the original image by reading thus stored data. The data storage is conducted in compressed form to economize the memory capacity required for data storage.

8 Claims, 7 Drawing Figures

IMAGE PROCESSING SYSTEM

BACKGROUND OF THE INVENTION

1. Field of the Invention

The present invention relates to an image processing system in which an image is processed as electrical digital image data.

2. Description of the Prior Art

For electrical image processing there are already known facsimile, image file and the like. Also there is known an image processing apparatus in which image data supplied from an image data input unit such as an original readino unit are stored in an image memory and are regenerated therefrom to obtain plural copies from a same original in an image output unit such as a printer. Such apparatus has the advantage of a shorter original setting time and therefore an improved copying efficiency in such plural copy making, since there is required only one reading of the original document and one storage of the image into the image memory. Also high-speed copying is rendered possible as the reciprocating time of the optical system can be disregarded.

However such conventional image processing apparatus cannot be made available inexpensively since it requires an expensive image memory of a large capacity in case of processing a large amount of image data.

SUMMARY OF THE INVENTION

In consideration of the foregoing, an object of the present invention is to provide an inexpensive high-speed image processing system capable of efficiently processing image data.

Another object of the present invention is to reduce the capacity of the image memory through the compression of image data, thereby providing an inexpensive image processing system.

Still another object of the present invention is to provide an image processing system capable of continuing the image processing even in the presence of an abnormality in the system.

The foregoing and still other objects of the present invention, and the advantages thereof, will become fully apparent from the following description.

DETAILED DESCRIPTION OF THE PREFERRED EMBODIMENTS

Now the present invention will be clarified in detail by embodiments thereof shown in the attached drawings.

Figure 1:
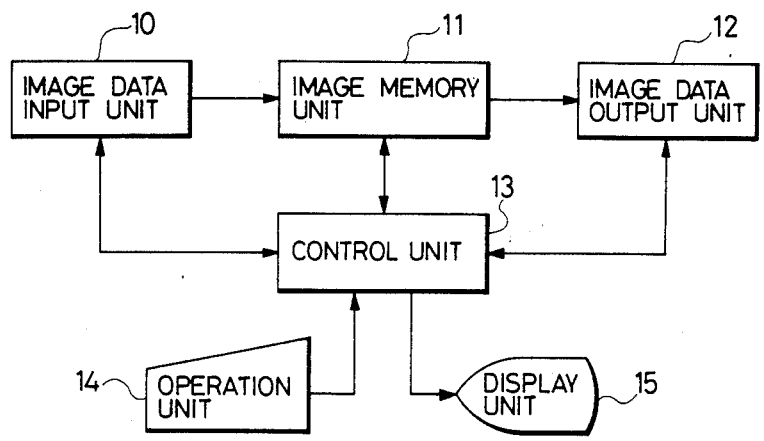
FIG. 1 is a block diagram showing an image processing apparatus embodying the present invention.

FIG. 1 shows an embodiment of the image processing apparatus of the present invention, wherein a digital data input unit 10 for supplying digitized image data can be composed of an original reading unit capable of reading an original image and releasing corresponding binary digital image data, or a word processor provided with a character generator and capable of releasing a document to be printed in the form of digital image data.

An image memory unit 11 is provided with an image memory for storing one or plural pages of the digital image data supplied from the image data input unit 10 and regenerating said data.

An image data output unit 12 for forming an image on a recording medium such as a recording sheet in response to the digital image data supplied from the image memory unit 11 can be composed for example of a laser beam printer, an ink jet printer or other printers. A facsimile apparatus for transmission of a digital image to or from a distant location can also be utilized as the image data output unit.

A control unit 13 controls the transmission of the image data amount the units 10–12 in response to command signals supplied from an operation unit 14. The operation unit 14 is provided with an operation table such as a keyboard. A display unit 15 equipped with display units and indicator lamps displays control information supplied by the control unit 13, such as the number of currently proceeding copying cycle in making plural copies in the image data output unit 12 from a same original, operation status of each unit, error status of each unit etc., thereby facilitate the operator to grasp the situation.

As will be explained in relation to FIG. 2, the image memory unit 11 is provided with a bypass for bypassing the entered image data and a selector switch for selecting said bypass, and is capable of selecting either a main path or the bypass according to the instruction of the control unit 13. Because of the unit structure, the present embodiment allows easy expansion of the system from a low-priced low performance system to a high-priced high performance system according to the requirement of the user, and also allows easy maintenance.

Figure 2:
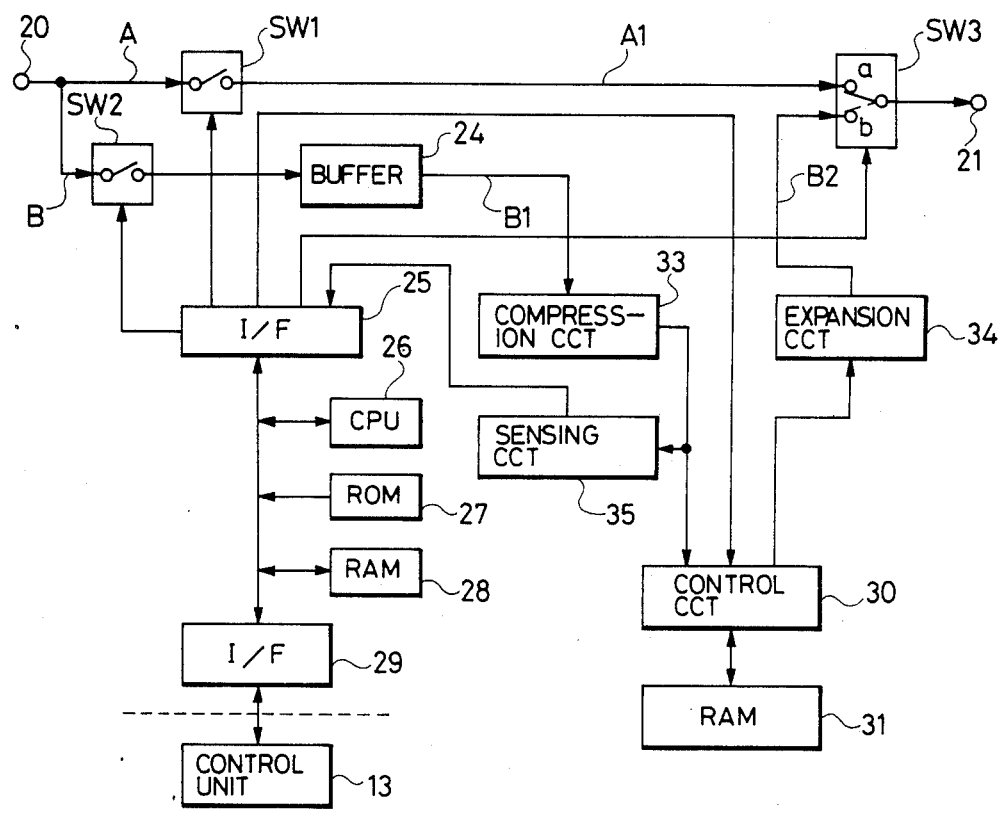
FIG. 2 is a block diagram showing an example of an image memory unit thereof.

FIG. 2 shows an example of the image memory unit 11 shown in FIG. 1. An image data input terminal 20, for entering the digital image data supplied from the image data input unit 10, is connected with a switch SW1 for selecting a first path A for transmitting the digital image data, and with a switch SW2 for selecting a second path B. An image data output terminal 21, for supplying digital image data to the image data output unit 12, is connected, through contacts a and b of a selector switch SW3 for changing the path of the digital image data, with an expansion circuit 34 and the switch SW1.

A buffer circuit 24, positioned between the switch SW2 and a compression circuit 33 and capable of storing for example the image data of one line, synchronizes the supplied digital image data with the main body of the image memory to be explained later when the second path B is selected by the switch SW2.

An interface (I/F) circuit 25 performs the input/output of control signals for the switches SW1–SW3 supplied from a CPU 26, control signals relating to the main part of the image memory etc. The CPU 26 controls the entire image memory unit 11 according to a control program stored in a ROM 27. A RAM 28 stores control information, functioning as a work memory. An interface (I/F) circuit 29 transmits, to the CPU 26, the commands supplied from the operation unit 14 through the control unit 13 shown in FIG. 1, thereby causing the CPU26 to perform controls corresponding to said commands.

A compression circuit 33 compresses the digital image data supplied from the buffer circuit 24. Said compression can for example be achieved by the modified Huffman encoding method employed in the facsimile apparatus for high-speed real-time compression.

The compressed digital image data supplied from the compression circuit 33 are supplied to a control circuit 30 and a detecting circuit 35. A dynamic RAM 31 constitutes the main part of the image memory, and the control circuit 31 controls the storage/regeneration of the digital image data in response to commands supplied from the I/F 25. The image memory may also be composed of an optical disk or a magneto-optical disk capable of high-speed access.

An expansion circuit 34 applies an expansion process to the digital data which are compressed by the compressing circuit 33, then stored in the RAM 31 and read therefrom, thereby regenerating the original image data.

In this manner the compression and expansion of image data utilized in the facsimile apparatus or the like are applied for the storage of image data in the image memory in the compressed form and the regeneration of the image data by expansion, thereby economizing the capacity of the image memory.

However the rate of data compression varies according to the nature of the image data, and so-called memory overflow may occur for certain image data of which the amount of data is still large after compression, for example image data in which black and white appear repeatedly or image data subjected to dither process for reproducing intermediate tone. In case of such memory overflow, therefore, it is desirable to supply the image data from the image data input unit directly for copying instead of storage in the image memory.

The detecting circuit 35 counts the amount of information of the digital image data compressed by the compressing circuit 33 for example by means of a counter, and discriminates whether said amount exceeds a determined amount of information, for example the memory capacity of the RAM 31. It is also possible to identify the amount of data after compression by detecting the content of the image data from the run length thereof prior to the compression by the compressing circuit 33. At the storage of the digital image data into the image memory after compression, the CPU 26 discriminates whether the compressed digital image data are properly stored in the RAM 31 according to the detection signal generated by the detection circuit 35.

A bypass A1 is connected with switches SW1, SW3 to constituting the first path A bypassing the RAM 31. More specifically the first path A consists of the image data input terminal 20, switch SW1, bypass A1, switch SW3 and image data output terminal 21. The second path B is composed of a digital image storing path B1 consisting of the image data input terminal 20, switch SW2, buffer 24, compressing circuit 33, control circuit 30 and RAM 31, and of a digital image regenerating path B2 consisting of the RAM 31, control circuit 30, expanding circuit 34, switch SW3 and image data output terminal 21.

In the present embodiment, the signal format of the digital image data in the image data input unit 10, image memory unit 11 and image data output unit 12 shown in FIG. 1 is unified, so that the image data input unit 10 and the image data output unit 12 may be directly connected.

Consequently, if the image memory unit 11 shown in FIG. 2 is positioned between the image data input unit 10 and the image data output unit 12 as shown in FIG. 1, it is rendered possible to supply the digital image data through the first path A for activating the image data output unit 12 while image data supplied from the image data input unit 10 are stored through the path B1 into the image memory unit 11. It is therefore rendered possible to improve the efficiency in case of supplying the image data output unit 12 with same image data from the image data input unit 10 plural times. Also in case of an abnormality in the image memory unit 11, for example in case of a breakdown in the RAM 31 or in case the data to be compressed are dither-processed binary signals and cannot be stored in the RAM 31 even after compression, the function of the image processing apparatus can be continued by selecting the first path A for supplying the digital image data to the image data output unit 12.

The image memory unit 11 can be realized with the commercial devices. For example, the CPU 26 can be composed of an 8-bit microprocessor 8085A manufactured by Intel Corp. The ROM 27 and the I/F 25 can be composed of a device 8355 incorporating a ROM and an I/O port manufactured by Intel Corp., and the RAM 28 and the I/O 29 can be composed of a device 8155 incorporating a RAM and an I/O port manufactured by Intel Corp. The buffer circuit 24 can be composed of a high-speed static memory, for example a device 2148 or 2149 manufactured by Intel Corp., and the RAM 31 can be composed of a 64 K dynamic RAM, for example a device 2164 manufactured by Intel Corp. The control circuit 30 can be composed of a dynamic RAM controller, such as a device 8202A manufactured by Intel Corp. The switches SW1, SW2 and the selector switch SW3 can be composed of standard Schottky TTL IC's. With these components, the image memory unit 11 can be realized inexpensively with a limited number of element chips.

FIGS. 3A to 3D show various switch states of the switches SW1–SW3 in the image memory unit 11, wherein an image memory system 40 (hereinafter simply called image memory) includes the RAM 31, control circuit 30, buffer circuit 24, compressing circuit 33 and expansion circuit 34. For the purpose of clarity, the control unit 13, I/F 25 etc. shown in FIGS. 1 and 2 are omitted.

Figure 3:
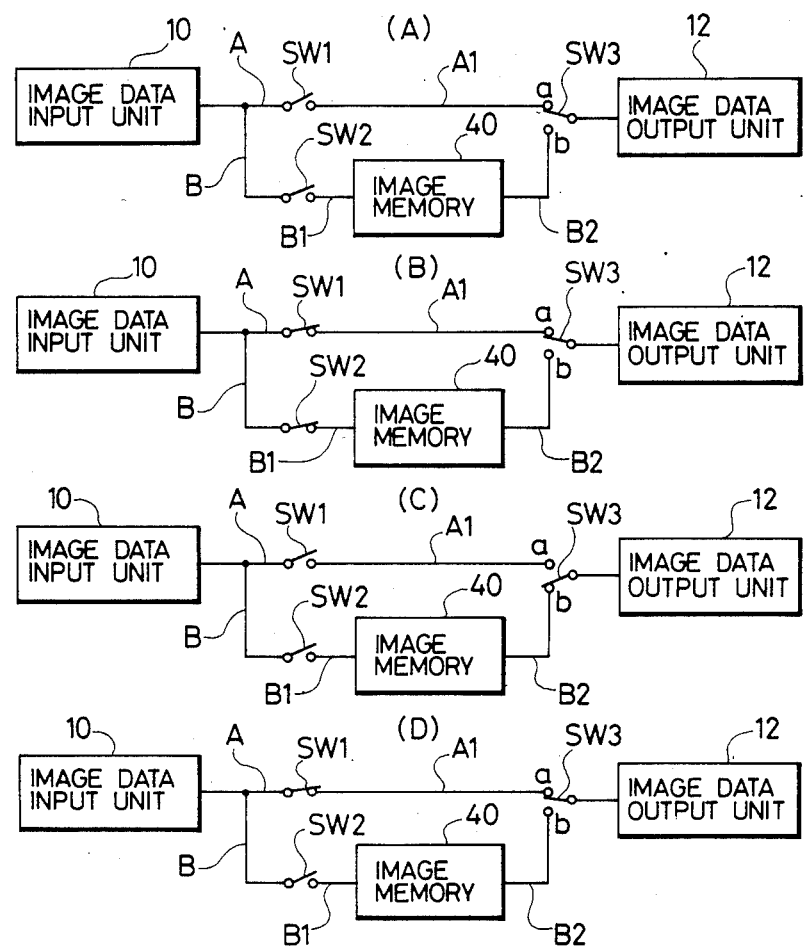
FIGS. 3A to 3D are block diagrams showing various switch states of the image memory unit shown in FIG. 2.

FIG. 3A shows an initial state at the start of power supply or in the stand-by time prior to the start of a copying operation. In this state, in response to a command supplied from the CPU 26 through the I/F 25, the switches SW1, SW2 are opened and the switch SW3 is connected to the contact a of the bypass A1.

FIG. 3B shows a state of making a first copy in the preparation of plural copies of a same image. In response to a command supplied from the CPU 26 through the I/F 25, the switches SW1, SW2 are closed while the switch SW3 is connected to the contact a of the bypass A1. In this state, therefore, the digital image data supplied from the image data input unit 10 are supplied through the first path A for image recording in the image data output unit 12, and simultaneously supplied through the path B1 to the image memory 40 for storage in the RAM 31 after compression in the compressing circuit 33. The detecting circuit 35 is simultaneously activated to detect eventual memory overflow.

The switching state shown in FIG. 3A is realized in response to the start of power supply, and the selection of the switching state shown in FIG. 3A or 3B is conducted according to the number of copies instructed by the operation unit 14.

FIG. 3C shows a state for the second or ensuing copies of a same image in case the compressed digital image data of one page are properly stored in the image memory 40 without detection of the memory overflow by the detecting circuit 35. In this state, in response to a command supplied from the CPU 26 through the I/F 25, the switches SW1, SW2 are both opened and the swtich SW3 is connected to a contact b at the path B2. Consequently the image data input unit 10 is detached from the system, and the digital image data are supplied, over a desired number of times, from the image memory 40 to the image data output unit 12 for image recording.

FIG. 3D shows a state in which the digital image data of a page cannot be stored in the image memory 40 and the detecting circuit 35 detects the memory overflow at the end of copying operation for the first copy in the state shown in FIG. 3B. In this state, in response to a command supplied from the CPU 26 through the I/F 25, the switch SW1 is closed while the switch SW2 is opened, and the switch SW3 is connected to the contact a of the path A1. In this case the image data input unit 10 is connected to the image data output unit 12 only through the first path A for the second and ensuing copies, whereby same image data are repeatedly released from the image data input unit 10. The digital image data are directly supplied to the image data output unit 12, bypassing the memory 40, thus obtaining a desired number of copies. This state can be applicable not only in case of memory overflow but also in case of disabled storage of the digital image data due to a trouble in the RAM 31 or in the control circuit 30. It is therefore possible to continue the copying operation for plural copies even in the presence of such trouble.

Figure 4:
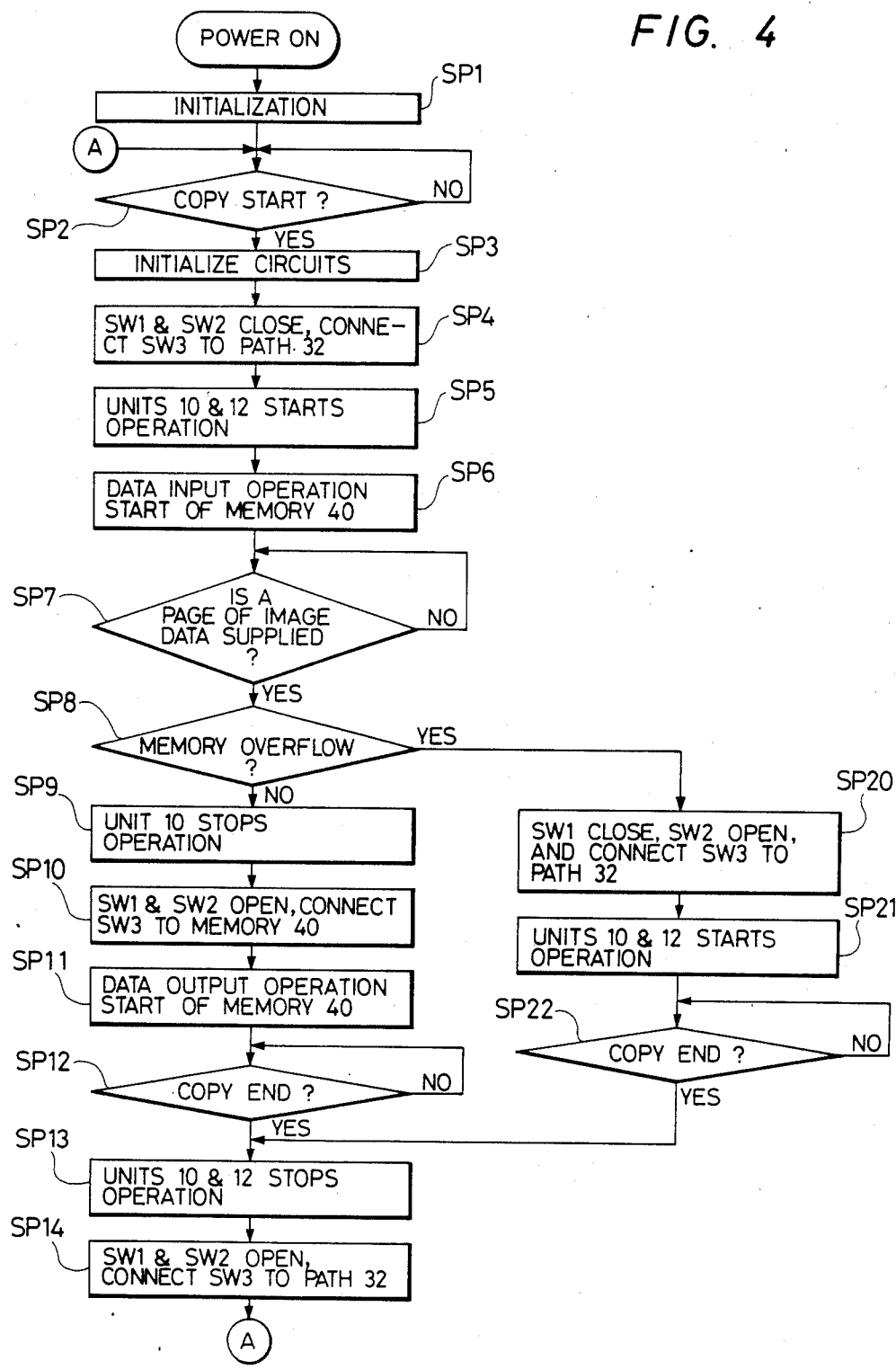
FIG. 4 is a flow chart showing an example of the control procedure of the image processing apparatus of the present invention.

FIG. 4 shows an example of the control procedure to be performed by the control unit 13 for the digital image processing apparatus shown in FIGS. 1 and 2, and particularly a portion of such procedure relating to the present invention. In the following there will be explained the control procedure shown in FIG. 4, with particular reference to FIGS. 3A to 3D.

At first, at the start of power supply to the apparatus shown in FIG. 1, a step SP1 initializes the display unit 15, I/O port etc. and also initializes the switches SW1-SW3 to the state shown in FIG. 3A. Thus the signal path from the image data input unit 10 to the image memory unit 11 is cut off, and no signal is supplied to the image data output unit 12. Consequently no input nor output of the digital image data is conducted even in case of an erroneous operation of the image data input unit 10 or the image data output unit 12.

Then a step SP2 discriminates the presence of a command for starting the copying operation from the operation unit 14 shown in FIG. 1, for example, through the actuation of a copy start key, and the program proceeds to a step SP3 in case of an affirmative result or awaits in case of a negative result.

The step SP3 initializes the detecting circuit 35, control circuit 30 etc. prior to the start of copying operation.

A step SP4 shifts the switches SW1-SW3 to a state shown in FIG. 3B, thereby supplying the digital image data from the image data input unit 10 directly to the image data output unit 12 through the path A and simultaneously supplying said data to the image memory 40 through the path B1.

A next step SP5 activates the image data input unit 10 and the image data output unit 12, whereby the image data output unit 12 performs image recording by directly receiving the digital image data from the image data input unit 10 through the path A.

A step SP6 initiates the storage of the digital image data entered through the switch SW2 which has been closed in the step SP4 for storage of said data in the image memory 40, thereby storing the digital image data of one page from the image data input unit 10 into the image memory 40 with signal compression by the compressing circuit 33.

A step SP7 discriminates whether the digital image data of one page have been supplied from the image data input unit 10, and the program proceeds to a step SP8 in case of an affirmative result or awaits the completion of data supply in case of a negative result. In case the image data output unit 12 is composed of a printer capable of realtime printing, for example a laser beam printer, the first copy is completed when the affirmative result is obtained in the step SP7.

The step SP8 discriminates, from the result of detection by the detecting circuit 35, whether the digital image data of one page have been properly compressed and stored in the RAM 31, namely the presence or absence of memory overflow. The program proceeds to a step SP20 in the presence of memory overflow, or to a step SP9 in the absence of memory overflow, indicating a proper storage.

Steps SP9 to SP12 represent a control procedure for the second and following copying cycles in case of obtaining plural copies from a same original.

The step SP9 terminates the function of the image data input unit 10 since the following copying operation is conducted with the image data read from the RAM 31. In case of the image data input unit 10 is composed for example of an original reading unit, the display unit 15 may display a message that a next original can be set on said reading unit.

The next step SP10 shifts the switches SW1-SW3 to a state shown in FIG. 3C to prepare for the expansion and regeneration of the digital image data of one page stored in the image memory 40 for supply to the image data output unit 12.

The next step SP11 regenerates the digital image data stored in the RAM 31 through the control circuit 30 and the expansion circuit 34, and supplies thus regenerated data to the image data output unit 12 through the switch SW3, thereby initiating the copying operation for the second and following copies.

A step SP12 discriminates whether the copies of a desired number have been obtained, and the program proceeds to a step SP13 in case of an affirmative result or awaits the completion of copying operation in case of a negative result, continuing the output of the image data from the image memory 40. Thus, while the step SP12 awaits the completion of the copying operation, the digital image data of one or more pages are regenerated from the image memory 40 and supplied to the image data output unit 12.

If the copying operation has been completed, the step SP13 terminates the function of the image data input unit 10 and the image data output unit 12, and a next step SP14 shifts the switches SW1-SW3 to a state shown in FIG. 3A, thereby terminating the entire copying operation. Then the program returns to a standby step SP2 and awaits a next command for starting the copying operation.

Now there will be explained steps SP20–SP22 to be executed in case memory overflow is identified in the step SP8.

The step SP20 shifts the switches SW1–SW3 to a state shown in FIG. 3D thereby detaching the image memory 40 from the copying operation, and connecting the image data input unit 10 with the image data output unit 12 through the bypass A1. Said memory overflow state is displayed on the display unit 15.

The next step SP21 activates the image data input unit 10 and the image data output unit 12, thereby supplying the digital image data from the image data input unit 10 to the image data output unit 12 through the path A, thus preparing one or plural copies until the completion of a desired number of copies is identified in the step SP22. In this case the image data are repeatedly supplied by the image data input unit 10 over a desired number of times.

In case the step SP22 identifies the completion of the copying operation, the program proceeds to the step SP13 to terminate the copying operation.

In the control procedure shown in FIG. 4, the digital image data are stored in the image memory 40 in the step SP6 even when only one copy is desired and the digital image data need not be regenerated from the image memory 40. It is therefore possible also to provide a step for identifying the number of copies between the steps SP3 and SP4 and to guide the program to the step SP20 in such case, thereby dispensing with the storage of the digital image data in the image memory 40. Also the switches SW1, SW2 and SW3 shown in FIG. 2 may be replaced by a 3-contact selector switch.

As explained in the foregoing, the use of a path passing through an image memory system comprising an image data compressing circuit, a memory and an expansion circuit and of a bypass detouring said image memory system with selection of said two paths according to the status of the image data allows to reduce the capacity of the image memory and to conduct the copying operation even in case of an overflow of the image memory.

Also the presence of the above-mentioned two paths allows, in case of obtaining plural copies from a single original, to obtain a first copy with the image data directly supplied to the image data output unit through the bypass and to simultaneously supply said image data to the image memory for storage therein. Consequently the operation time can be significantly shortened in comparison with the conventional apparatus in which the first copy is prepared with the image data once stored in the image memory and then regenerated therefrom.

What is claimed is:

1. An image processing system comprising:
   input means for entering image data;
   means for compressing the image data entered by said input means;
   memory means for storing the image data compressed by said compressing means;
   means for expanding the image data stored in said memory means;
   means for image formation;
   control means for causing the image data entered from said input means to be supplied through said compressing means to said memory means as well as to said image forming means for a first image formation and causing the image data stored in said memory means to be supplied through said expanding means to said image forming means for ensuing image formation; and
   means for detecting the storage status of the compressed image data in said memory means;
   wherein said control means is adapted to cause the image data entered from said input means to be supplied to said image forming means for the ensuing image formation, when said detecting means detects an improper storage of the compressed image data in said memory means.

2. A system according to claim 1, wherein said detecting means detects the amount of compressed image data stored in said memory means.

3. A system according to claim 1, wherein said input means is reading means for reading an original image to form image data.

4. A system according to claim 1, wherein said image forming means is recording means for image recording on a recording material.

5. A system according to claim 1, further comprising means for setting a number of image formatIons to be performed by said image forming means.

6. A system according to claim 1, wherein said control means causes said input means to enter the image data when said detecting means detects improper storage status.

7. A system according to claim 1, wherein said control means is operable to cause said expanding means to repeatedly expand the same image data stored in said memory means and supply said image data to said image forming means for image formation therein a desired number of times, when said detecting means does not detect improper storage of data.

8. A system according to claim 1, further comprising:
   a first path for transmitting the image data entered from said input means to said image forming means through said compressing means, said memory means and said expanding means; and
   a second path for transmitting the image data entered from said input means to said image forming means bypassing said compressing means, said memory means and said expanding means; wherein said control means includes means for selecting either said first path or said second path according to the result of detection by said detecting means.

* * * * *